350-3.6 SR CROSS REFERENCE SEARCH ROOM
XR T 861,026
A 3031Y
ADDED
April 15, 1969 J. S. HARPER ET AL DEF. PUB.
METHOD OF MAKING WHITE LIGHT HOLOGRAMS SN - 697792
Filed Jan. 15, 1968
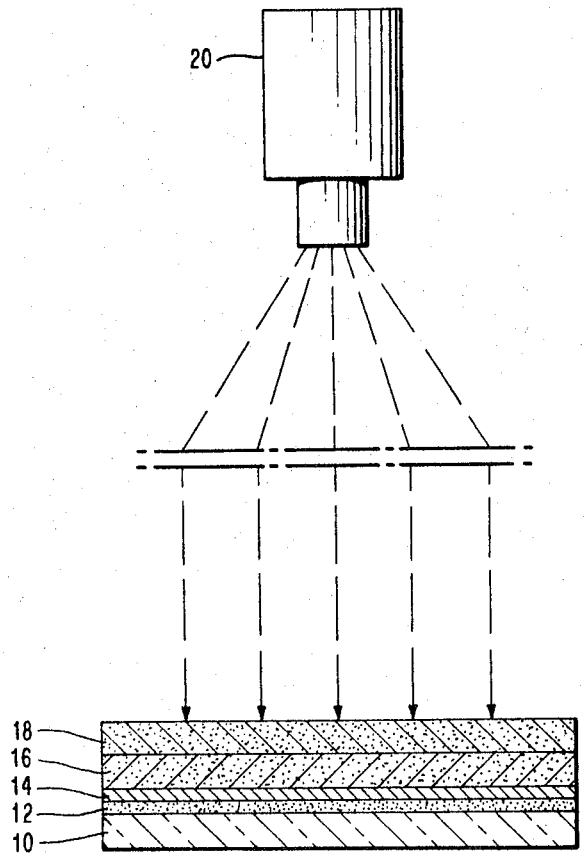
INVENTORS
JOHN S. HARPER
HAROLD H. HERO
ROBERT V. POLE
BY John J. Goodwin
ATTORNEY
T861026
OR IN 96/27R

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 15, 1969

861 O.G. 703

697,792

METHOD OF MAKING WHITE LIGHT HOLOGRAMS

John S. Harper, Carmel, Harold H. Herd, Ossining, and Robert V. Pole, Yorktown Heights, N.Y., assignors to International Business Machines Corporation, Armonk, N.Y., a corporation of New York

Filed Jan. 15, 1968. Published Apr. 15, 1969

Class 96—27

1 Sheet Drawing. 13 Pages Specification

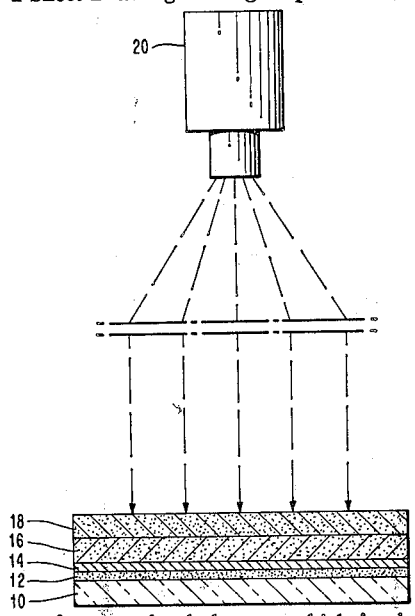

The manufacture of a hologram which is viewable in white light by a photographic printing method is disclosed. In the first step of the method, a master hologram of a conventional type is placed in close contact with an unexposed photographic emulsion, which is the top layer of a multilayer structure. Alternatively, instead of a hologram, an article referred to as a holocoder may be placed in contact with the emulsion. The emulsion is the top layer of a structure including a rigid base having a smooth upper surface which is coated with a thin layer of gelatin and a thin layer of metallic silver. The multilayer structure is exposed through the hologram by monochromatic light or by light emitted from a laser.

The light is spatially modulated by the hologram and then reflected by the silver layer which functions as a mirror, thereby forming spatially modulated standing waves in the unexposed emulsion.

In the next step, the hologram is removed and the remaining layers of the article are developed and fixed. The multilayer structure is then bleached so that the metallic silver in both the emulsion and the silver layer is converted into silver bromide, which is then re-exposed to the laser light or the monochromatic light and re-developed. As a result, there is opaque granular silver both in the exposed area of the emulsions and in the silver layer which previously functioned as a mirror. The article thus produced is a hologram which can be viewed in white light.